US 9,223,415 B1

(12) United States Patent
Zhou et al.

(10) Patent No.: US 9,223,415 B1
(45) Date of Patent: Dec. 29, 2015

(54) MANAGING RESOURCE USAGE FOR TASK PERFORMANCE

(75) Inventors: Dong Zhou, San Jose, CA (US); Gunnar Hovden, Los Gatos, CA (US); Isaac S. Noble, Soquel, CA (US); Volodymyr V. Ivanchenko, Mountain View, CA (US); Kenneth M. Karakotsios, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 443 days.

(21) Appl. No.: 13/352,087

(22) Filed: Jan. 17, 2012

(51) Int. Cl.
*G06F 3/033* (2013.01)
*G06F 3/0346* (2013.01)
*H04N 1/00* (2006.01)
*G06K 9/00* (2006.01)

(52) U.S. Cl.
CPC .......... *G06F 3/0346* (2013.01); *G06K 9/00335* (2013.01); *H04N 1/00885* (2013.01)

(58) Field of Classification Search
CPC ............................. G06F 3/0346; G06F 3/0304
USPC .......................... 345/156–184; 348/135–139; 382/312–324
See application file for complete search history.

(56) References Cited

U.S. PATENT DOCUMENTS

| 4,836,670 | A | 6/1989 | Hutchinson |
| 4,866,778 | A | 9/1989 | Baker |
| 5,563,988 | A | 10/1996 | Maes et al. |
| 5,616,078 | A | 4/1997 | Oh |
| 5,621,858 | A | 4/1997 | Stork et al. |
| 5,632,002 | A | 5/1997 | Hashimoto et al. |
| 5,850,211 | A | 12/1998 | Tognazzini |
| 5,960,394 | A | 9/1999 | Gould et al. |
| 5,999,091 | A | 12/1999 | Wortham |
| 6,185,529 | B1 | 2/2001 | Chen et al. |
| 6,272,231 | B1 | 8/2001 | Maurer et al. |
| 6,385,331 | B2 | 5/2002 | Harakawa et al. |
| 6,429,810 | B1 | 8/2002 | De Roche |
| 6,434,255 | B1 | 8/2002 | Harakawa |

(Continued)

FOREIGN PATENT DOCUMENTS

| CN | 1694045 A | 11/2005 |
| GB | 2440348 | 1/2008 |

(Continued)

OTHER PUBLICATIONS

Nokia N95 8GB Data Sheet, Nokia, 2007, 5 page.

(Continued)

*Primary Examiner* — Kent Chang
*Assistant Examiner* — Andrew Lee
(74) *Attorney, Agent, or Firm* — Novak Druce Connolly Bove + Quigg LLP

(57) ABSTRACT

The use of resources on a computing device can be optimized for current conditions to reduce or minimize the amount of resources needed to provide a sufficient level of performance for various types of tasks. In some embodiments, one or more optimization algorithms can analyze information such as a type of task to be performed and the state of one or more environmental conditions to attempt to select a number and configuration of components, such as cameras and illumination elements, to use in performing the tasks. The performance of the tasks can be monitored, and the selection or states updated in order to maintain a sufficient level of performance without using more resources than are necessary.

26 Claims, 7 Drawing Sheets

(56) References Cited

U.S. PATENT DOCUMENTS

| | | |
|---|---|---|
| 6,594,629 B1 | 7/2003 | Basu et al. |
| 6,728,680 B1 | 4/2004 | Aaron et al. |
| 6,750,848 B1 | 6/2004 | Pryor |
| 6,863,609 B2 | 3/2005 | Okuda et al. |
| 6,865,516 B1 | 3/2005 | Richardson |
| 6,959,102 B2 | 10/2005 | Peck |
| 7,039,198 B2 | 5/2006 | Birchfield |
| 7,082,393 B2 | 7/2006 | Lahr |
| 7,095,401 B2 | 8/2006 | Liu et al. |
| 7,199,767 B2 | 4/2007 | Spero |
| 7,301,526 B2 | 11/2007 | Marvit et al. |
| 7,379,566 B2 | 5/2008 | Hildreth |
| 7,401,783 B2 | 7/2008 | Pryor |
| 7,519,223 B2 | 4/2009 | Dehlin et al. |
| 7,584,158 B2 | 9/2009 | Iwaki et al. |
| 7,587,053 B1 | 9/2009 | Pereira |
| 7,605,837 B2 | 10/2009 | Yuen et al. |
| 7,613,310 B2 | 11/2009 | Mao et al. |
| 7,675,539 B2 | 3/2010 | Matsui |
| 7,760,248 B2 | 7/2010 | Marks et al. |
| 7,761,302 B2 | 7/2010 | Woodcock et al. |
| 8,063,938 B2 | 11/2011 | Ueki et al. |
| 8,150,063 B2 | 4/2012 | Chen et al. |
| 8,165,422 B2 | 4/2012 | Wilson |
| 8,296,151 B2 | 10/2012 | Klein et al. |
| 8,788,977 B2 | 7/2014 | Bezos |
| 2002/0071277 A1 | 6/2002 | Starner et al. |
| 2002/0111819 A1 | 8/2002 | Li et al. |
| 2002/0180799 A1 | 12/2002 | Peck et al. |
| 2002/0194005 A1 | 12/2002 | Lahr |
| 2003/0004792 A1 | 1/2003 | Townzen et al. |
| 2003/0028577 A1 | 2/2003 | Dorland et al. |
| 2003/0069648 A1 | 4/2003 | Douglas et al. |
| 2003/0083872 A1 | 5/2003 | Kikinis |
| 2003/0142068 A1 | 7/2003 | DeLuca et al. |
| 2003/0156756 A1 | 8/2003 | Gokturk et al. |
| 2003/0171921 A1 | 9/2003 | Manabe et al. |
| 2003/0179073 A1 | 9/2003 | Ghazarian |
| 2004/0026529 A1 | 2/2004 | Float et al. |
| 2004/0122666 A1 | 6/2004 | Ahlenius |
| 2004/0140956 A1 | 7/2004 | Kushler et al. |
| 2004/0205482 A1 | 10/2004 | Basu et al. |
| 2005/0064912 A1 | 3/2005 | Yang et al. |
| 2005/0133693 A1 | 6/2005 | Fouquet et al. |
| 2005/0162381 A1 | 7/2005 | Bell et al. |
| 2005/0216867 A1 | 9/2005 | Marvit et al. |
| 2005/0248529 A1 | 11/2005 | Endoh |
| 2005/0275638 A1 | 12/2005 | Kolmykov-Zotov et al. |
| 2006/0143006 A1 | 6/2006 | Asano |
| 2007/0164989 A1 | 7/2007 | Rochford et al. |
| 2008/0005418 A1 | 1/2008 | Julian |
| 2008/0013826 A1 | 1/2008 | Hillis et al. |
| 2008/0019589 A1 | 1/2008 | Yoon |
| 2008/0040692 A1 | 2/2008 | Sunday et al. |
| 2008/0122803 A1 | 5/2008 | Izadi et al. |
| 2008/0136916 A1 | 6/2008 | Wolff |
| 2008/0158096 A1 | 7/2008 | Breed |
| 2008/0174570 A1 | 7/2008 | Anzures |
| 2008/0262849 A1 | 10/2008 | Buck et al. |
| 2008/0266257 A1 | 10/2008 | Chiang |
| 2008/0266530 A1 | 10/2008 | Takahashi et al. |
| 2008/0276196 A1 | 11/2008 | Tang |
| 2009/0031240 A1 | 1/2009 | Hildreth |
| 2009/0079813 A1 | 3/2009 | Hildreth |
| 2009/0102788 A1* | 4/2009 | Nishida et al. ............... 345/158 |
| 2009/0103780 A1 | 4/2009 | Nishihara et al. |
| 2009/0153288 A1 | 6/2009 | Hope et al. |
| 2009/0154807 A1 | 6/2009 | Rossato et al. |
| 2009/0196460 A1 | 8/2009 | Jakobs et al. |
| 2009/0210789 A1 | 8/2009 | Thakkar et al. |
| 2009/0217210 A1 | 8/2009 | Zheng et al. |
| 2009/0265627 A1 | 10/2009 | Kim et al. |
| 2009/0271004 A1 | 10/2009 | Zecchin et al. |
| 2009/0313584 A1 | 12/2009 | Kerr |
| 2010/0040292 A1 | 2/2010 | Clarkson |
| 2010/0050133 A1 | 2/2010 | Nishihara et al. |
| 2010/0066676 A1 | 3/2010 | Kramer et al. |
| 2010/0097332 A1 | 4/2010 | Arthur et al. |
| 2010/0104134 A1* | 4/2010 | Wang et al. ............... 382/103 |
| 2010/0111416 A1 | 5/2010 | Meiers |
| 2010/0125816 A1 | 5/2010 | Bezos |
| 2010/0169840 A1 | 7/2010 | Chen et al. |
| 2010/0179811 A1 | 7/2010 | Gupta et al. |
| 2010/0233996 A1 | 9/2010 | Herz et al. |
| 2010/0280983 A1 | 11/2010 | Cho et al. |
| 2010/0306335 A1 | 12/2010 | Rios et al. |
| 2011/0006978 A1 | 1/2011 | Yuan |
| 2011/0109726 A1 | 5/2011 | Hwang et al. |
| 2011/0128223 A1 | 6/2011 | Lashina et al. |
| 2011/0164105 A1 | 7/2011 | Lee et al. |
| 2011/0184735 A1 | 7/2011 | Flaks et al. |
| 2011/0262010 A1 | 10/2011 | Thorn |
| 2011/0285807 A1 | 11/2011 | Feng |
| 2011/0314427 A1 | 12/2011 | Sundararajan |
| 2012/0005632 A1 | 1/2012 | Broyles et al. |
| 2012/0027252 A1 | 2/2012 | Liu et al. |
| 2012/0058565 A1 | 3/2012 | Berkelman et al. |
| 2012/0124603 A1 | 5/2012 | Amada |
| 2012/0147531 A1* | 6/2012 | Rabii ............... 361/679.01 |
| 2012/0206333 A1 | 8/2012 | Kim |
| 2012/0281129 A1* | 11/2012 | Wang et al. ............... 348/333.01 |
| 2013/0004016 A1 | 1/2013 | Karakotsios |
| 2013/0050425 A1* | 2/2013 | Im et al. ............... 348/46 |
| 2013/0082978 A1* | 4/2013 | Horvitz et al. ............... 345/175 |
| 2013/0155237 A1* | 6/2013 | Paek et al. ............... 348/148 |
| 2014/0285435 A1 | 9/2014 | Bezos |

FOREIGN PATENT DOCUMENTS

| | | |
|---|---|---|
| JP | 2002-164990 | 6/2002 |
| JP | 2002-351603 | 12/2002 |
| JP | 2004-318826 | 11/2004 |
| JP | 2007-121489 | 5/2007 |
| JP | 2007-243250 | 9/2007 |
| JP | 2008-97220 | 4/2008 |
| JP | 2008-186247 | 8/2008 |
| WO | WO 02/15560 A3 | 2/2002 |
| WO | WO 2006/036069 A1 | 4/2006 |

OTHER PUBLICATIONS

"Face Detection: Technology Puts Portraits in Focus", Consumerreports.org, http://www.comsumerreports.org/cro/electronics-computers/camera-photograph/cameras, 2007, 1 page.

"Final Office Action dated Oct. 27, 2011", U.S. Appl. No. 12/332,049, 66 pages.

"Final Office Action dated Jun. 6, 2013", U.S. Appl. No. 12/332,049, 70 pages.

"First Office Action dated Mar. 22, 2013", China Application 200980146841.0, 18 pages (including translation.).

"International Search Report dated Apr. 7, 2010", International Application PCT/US2009/065364, 2 pages.

"International Written Opinion dated Apr. 7, 2010", International Application PCT/US2009/065364, 6 pages.

"Introducing the Wii MotionPlus, Nintendo's Upcoming Accessory for the Revolutionary Wii Remote at Nintendo:: What's New", Nintendo Games, http://www.nintendo.com/whatsnew/detail/eM-MuRj__N6vntHPDycCJAKWhE09zBvyPH, Jul. 14, 2008, 2 pages.

"Non-Final Office Action dated Jun. 10, 2011", U.S. Appl. No. 12/332,049, 48 pages.

"Non-Final Office Action dated Nov. 7, 2012", U.S. Appl. No. 12/332,049, 64 pages.

"Office Action dated Dec. 21, 2012", Korea Application 10-2011-7013875, 4 pages (including translation.).

"Non-Final Office Action dated Feb. 3, 2014", U.S. Appl. No. 13/198,008, 19 pages.

"Notice of Allowance dated Mar. 4, 2014", U.S. Appl. No. 12/332,049, 8 pages.

"Office Action dated Apr. 2, 2013", Japan Application 2011-537661, 4 pages (including translation.).

(56) References Cited

OTHER PUBLICATIONS

"Office Action dated May 13, 2013", Canada Application 2,743,914, 2 pages.

Brashear, Helene et al., "Using Multiple Sensors for Mobile Sign Language Recognition", International Symposium on Wearable Computers, 2003, 8 pages.

Cornell, Jay, "Does This Headline Know You're Reading It?", h+ Magazine, located at <http://hplusmagazine.com/articles/ai/does-headline-know-you%E2%80%99re-reading-it>, last accessed on Jun. 7, 2010, Mar. 19, 2010, 4 pages.

Haro, Antonio et al., "Mobile Camera-Based Adaptive Viewing", MUM '05 Proceedings of the 4th International Conference on Mobile and Ubiquitous Mulitmedia., 2005, 6 pages.

Padilla, Raymond, "Eye Toy (PS2)", <http://www.archive.gamespy.com/hardware/august03/eyetoyps2/index.shtml, Aug. 16, 2003, 2 pages.

Schneider, Jason, "Does Face Detection Technology Really Work? Can the hottest new digital camera feature of 2007 actually improve your people pictures? Here's the surprising answer!", http://www.adorama.com/catalog.tpl?article=052107op=academy_new, May 21, 2007, 5 pages.

Tyser, Peter, "Control an iPod with Gestures", http://www.videsignline.com/howto/170702555, Sep. 11, 2005, 4 pages.

Valin, Jean-Marc et al., "Robust Sound Source Localization Using a Microphone Array on a Mobile Robot", Research Laboratory on Mobile Robotics and Intelligent Systems; Department of Electrical Engineering and Computer Engineering; Universite de Sherbrooke, Quebec, Canada, 9 pages.

Zyga, Lisa, "Hacking the Wii Remote for Physics Class", PHYSorg.com, http://www.physorg.com/news104502773.html, Jul. 24, 2007, 2 pages.

"Final Office Action dated Aug. 29, 2014," U.S. Appl. No. 13/198,008, 24 pages.

"Non-Final Office Action dated Oct. 6, 2014," U.S. Appl. No. 14/298,577, 9 pages.

"Third Office Action dated May 20, 2014," Chinese Application No. 200980146841.0, 8 pages.

"Supplementary European Search Report dated Jul. 17, 2014," European Application No. EP09828299.9, 13 pages.

"Reexamination Report dated Aug. 28, 2014," Japanese Application No. 2011-537661, 5 pages.

"Examiner's Report dated Mar. 21, 2014," Canadian Application No. 2,743,914, 3 pages.

\* cited by examiner

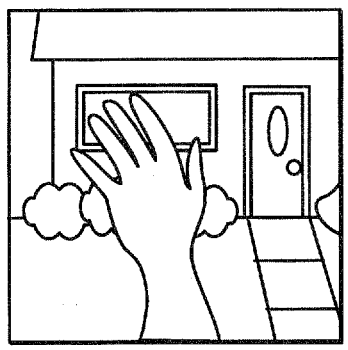
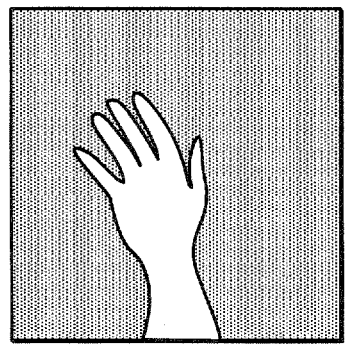
FIG. 4(a)                FIG. 4(b)
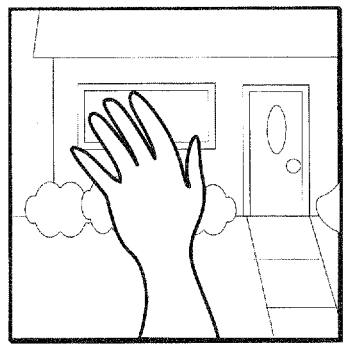
FIG. 4(c)

MANAGING RESOURCE USAGE FOR TASK PERFORMANCE

BACKGROUND

People are increasingly interacting with computers and other electronic devices in new and interesting ways. One such interaction approach involves making a detectable motion with respect to a device. While complex motion analysis devices are able to determine the motion with relative accuracy, such analysis is difficult to implement on consumer devices, particularly mobile or portable computing devices that generally have limited battery life and processing capability. Similar problems arise with other interactions and processes that can be very resource intensive, which can prevent or severely limit their usage on various devices. Further, changes in environmental conditions can affect the performance of a device, such that a device typically has to utilize more resources than necessary in order to be able to handle the wide variety of environmental conditions, even though at most times the device is using more resources than necessary for current conditions.

BRIEF DESCRIPTION OF THE DRAWINGS

Various embodiments in accordance with the present disclosure will be described with reference to the drawings, in which:

FIGS. 4(a), (b), and (c) illustrate example images for analysis with different types of illumination in accordance with various embodiments;

DETAILED DESCRIPTION

Systems and methods in accordance with various embodiments of the present disclosure may overcome one or more of the aforementioned and other deficiencies experienced in conventional approaches to managing resources for an electronic device. In particular, various embodiments utilize one or more control and/or optimization algorithms to attempt to determine a number and selection of resources needed to perform any of number of different types of tasks under current conditions. For example, a computing device might have multiple cameras with at least partially overlapping fields of view. In some embodiments, each of these cameras might also have an associated illumination element, which can project white light, infrared radiation, or the like. If the device is attempting to perform a task such as to identify a user using facial recognition, determine a gaze direction or head location of a user, or provide for gesture recognition, for example, the device might utilize one or more control algorithms to attempt to determine information such as whether illumination is needed, whether the device needs to compensate for motion, what type and/or how much illumination is needed, how many cameras are needed, what resolution level is needed, and other such information. In some embodiments, the algorithms can determine various combinations of components and resources to attempt to select a combination that provides for the lowest amount of consumption of at least one type of resource, such as the lowest power usage, lowest processing requirements, etc. In other embodiments, one or more algorithms can attempt to select resources for a task in order to optimize the usage and or selection of resources to perform one or more tasks under current conditions.

Various other applications, processes and uses are presented below with respect to the various embodiments.

Figure 1:
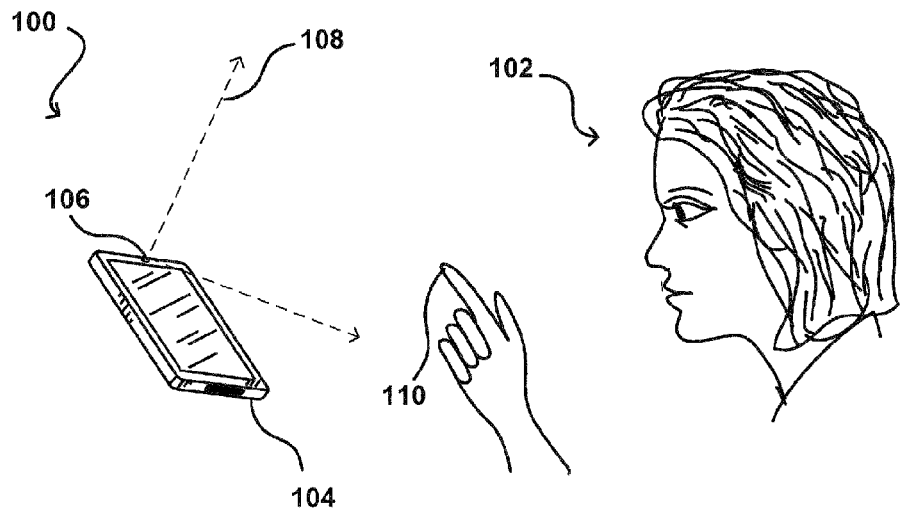
FIG. 1 illustrates an example environment in which various aspects can be implemented in accordance with various embodiments.

FIG. 1 illustrates an example situation 100 wherein a user 102 would like to provide gesture- and/or motion-based input to a computing device 104, such as to wake up the device, flip to the next page in an electronic book ("e-book"), select an option of a graphical user interface (GUI), or perform another such action. Although a portable computing device (e.g., a smart phone, an e-book reader, or tablet computer) is shown, it should be understood that various other types of electronic device that are capable of determining and processing input can be used in accordance with various embodiments discussed herein. These devices can include, for example, notebook computers, personal data assistants, cellular phones, video gaming consoles or controllers, and portable media players, among others. In this example, the computing device 104 has at least one camera 106 (e.g., a digital still camera, video camera, optical sensor, or other such image capture element) operable to perform image capture over an associated capture range 108. Each image capture element may be, for example, a charge-coupled device (CCD) or complimentary metal-oxide semiconductor (CMOS) sensor, for example, or can utilize another appropriate image capturing technology.

In this example, the user 102 is performing a selected motion or gesture using the user's fingertip 110. The motion can be one of a set of motions or gestures recognized by the device to correspond to a particular input or action, or can be a specific motion or gesture associated with that particular user. If the motion is performed within the angular capture range 108 (i.e., field of view) of at least one of the cameras 106 on the device, the device can capture image information including at least a portion of the motion or gesture, analyze the image information using at least one image or video analysis algorithm, and determine movement of at least one feature of the user between subsequent frames or portions of the image information. Such detection is useful for various types of gesture, such as a user waving an arm back and forth to wake up a device, moving a hand up and down to provide navigational input, and the like. Various types of motion input are described, for example, in co-pending U.S. patent application Ser. No. 12/332,049, filed Dec. 10, 2008, and entitled "Movement Recognition as Input Mechanism," which is hereby incorporated herein by reference.

In many instances, having a single camera on the device might be insufficient to provide all the desired input to the device for various tasks. For example, certain gestures might be distance-dependent such that a single camera might not be sufficient to provide the necessary distance information, at least without complicated image analysis algorithms. Using two or more cameras can provide depth information, which can enable the relative positions of objects near the device to be determined in three dimensions. Similarly, each camera will have a specific field of view, such that only having one or two cameras on the device might limit the ability of the device to capture information in all or most directions around the device. Similarly, a single light source (e.g., LED) will provide illumination over a specific range of angles, and may not provide adequate lighting in multiple directions. Various other limitations result from having a small number of components on a device as well as should be apparent.

Figures 2A, 2B:
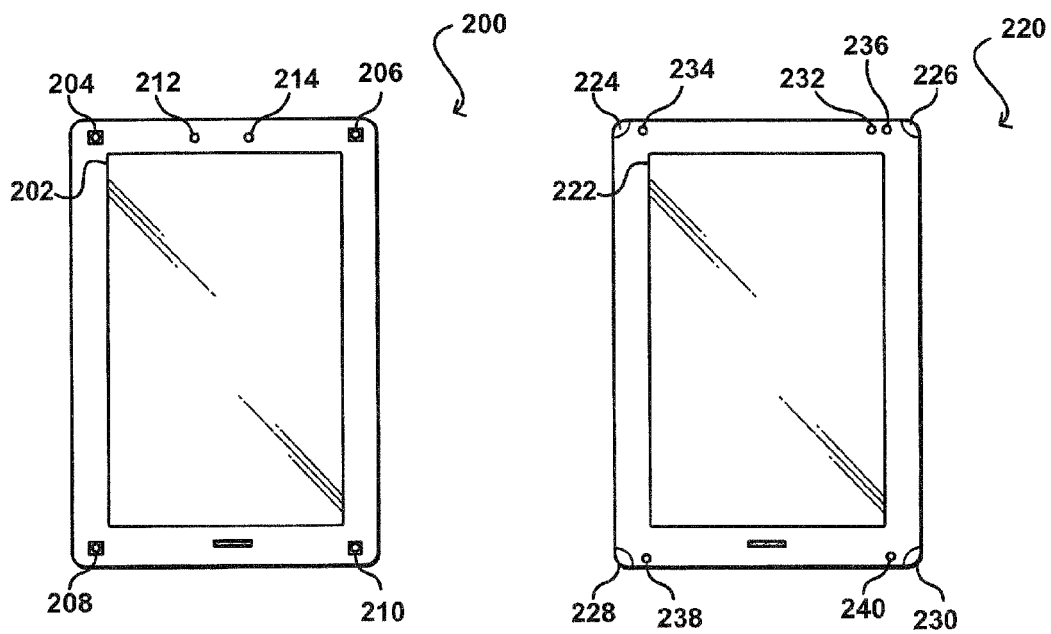
FIGS. 2(a) and 2(b) illustrate example device configurations that can be utilized in accordance with various embodiments.

FIG. 2(a) illustrates a first example device 200 including multiple components that can be used to capture image information in accordance with various embodiments. It should be understood that, while the components of the example device are shown to be on a "front" of the device, there can be similar or alternative components on the sides or back of the device as well (or instead). Further, directions such as "top," "side," and "back" are used for purposes of explanation and are not intended to require specific orientations unless otherwise stated. In this example device 200, there are four cameras 204, 206, 208, 210 on a same side of the device as a primary display element 202 (e.g., an LCD display screen). Using such an arrangement, the device likely will have at least one or two cameras facing the user at any time that are unobstructed by objects, such as by the user holding the device, which can at least partially obscure a view of at least a portion of the user to various cameras on the device. In this example, the device 200 also includes an illumination element 212 operable to project illumination (e.g., white light or IR) in a direction of the user, to assist with image capture. The device also includes a light sensor 214 for use in determining when illumination might be needed.

FIG. 2(b) illustrates another example device 220 wherein the cameras 224, 226, 228, 230 are positioned on the corners of the device. If the devices have a sufficient wide-angle lens (e.g., a fish-eye lens), the cameras can have at least partially overlapping fields of view such that the cameras might be able to capture information in substantially any direction around the device. In this example, each camera also has an associated illumination element 234, 236, 238, 240 operable to direct light over a range of angles associated with a respective camera. Although the illumination elements are shown on the front of the device for convenience, it should be understood that the illumination elements can be on the corners of the device as well, and in at least some embodiments can utilize the same wide-angle lenses to project light over a range of angles at least including the field of view of the respective camera. This example device can also include a display screen 222, light sensor 232, and other such elements as discussed elsewhere herein.

As discussed, an advantage of having a large number of cameras, illumination elements, and other such components is that image data can be captured in a number of different directions with sufficient illumination without significant concern about obstructions or other such occurrences. A potential downside, however, is that capturing image information using a large number of cameras requires a significant amount of battery power to operate the cameras, a significant amount of memory to store all the image information, and a significant amount of processing capacity to process the large amount of image information, particularly for relatively high resolution cameras. Similarly, using illumination for each of these cameras can significantly drain the battery in the device. In many instances, less than all of these components will be sufficient to perform a desired task. Approaches in accordance with various embodiments attempt to reduce and/or optimize the amount of resources used to perform a specific task under current conditions.

Figure 3A:
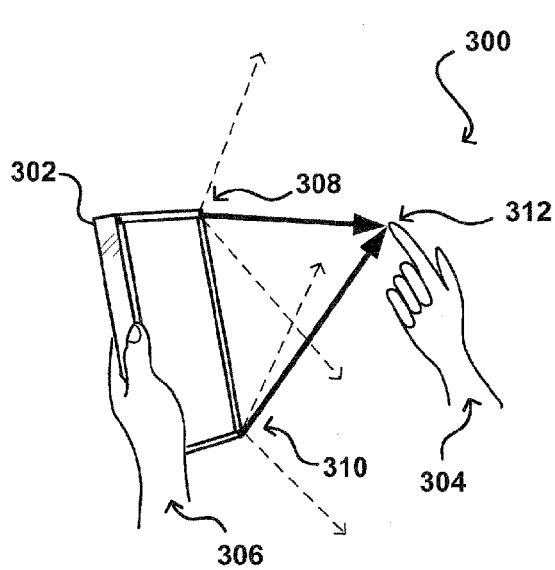
FIGS. 3(a), (b), (c), (d), (e), and (f) illustrate example approaches to selecting components for use in performing a task that can be used in accordance with various embodiments.
Figure 3B:
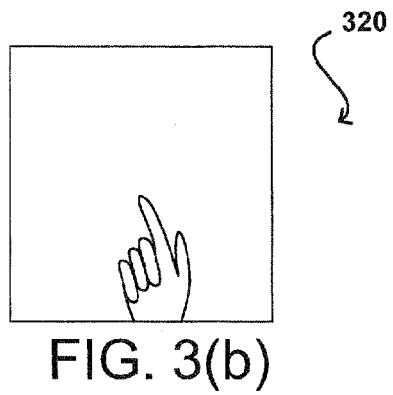
Figure 3C:
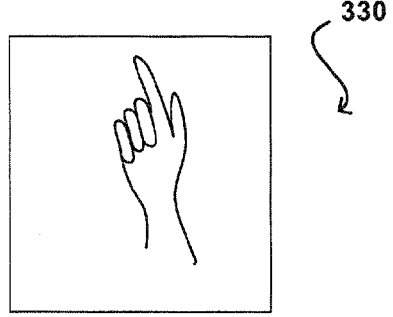

For example, FIG. 3(a) illustrates a situation where a user is performing a gesture using a fingertip 312 within a field of view of one or more cameras on an example computing device 302. In this example, the gestures being performed might be relatively simple and the lighting adequate such that not all four cameras are needed to accurately determine the motion of the user's fingertip relative to the device. For very simple gesture modes, a single camera might be adequate. In some cases, two of the cameras can be used in order to provide for stereo image capture, which provides distance information in addition to position information as known in the art for stereo imaging. For example, FIG. 3(b) illustrates a first image 320 that might be captured of the user's fingertip using a first camera 308 of the device 302, and FIG. 3(c) illustrates a second image 330 that can be captured of the user's fingertip at substantially the same time using a second camera 310. The location of the fingertip in each image can be used to determine a direction to the fingertip from the respective camera, using information such as the field of view of the camera and the number of pixels for that field of view. The location to the fingertip from each camera can be represented by a direction vector as illustrated in FIG. 3(a). By knowing the relative position of each camera on the device, the direction vectors can be added or otherwise analyze using vector manipulation to determine the position of the fingertip 312 with respect to the device 302 in three dimensional space.

In many cases, however, it will not be sufficient to simply select two cameras to use to perform gesture recognition. For example, in FIG. 3(a) the user is holding the device with the user's left hand, which prevents the camera positioned on the lower left front of the device (not visible in the figure) from capturing images of the user's fingertip as the view is obstructed by the user's left hand. If the user was left handed, the user might instead hold the device in the user's right hand in order to form gestures with the user's left hand. Thus, a different combination of cameras might have an unobstructed view of the user's fingertip. In one example, an algorithm executing on the device might cause the cameras near the right edge of the device (from the perspective of the user) to be used to capture images for gesture recognition. In at least some embodiments, the hand that the user is using to make gestures can be monitored over time, such that if the user switches the hand currently holding the device or makes another such adjustment, the device can adjust the active cameras accordingly, such that the device is only using two cameras at any time to capture image information, and the two currently active cameras are selected to be most likely to be able to view a gesture performed by the user. There can be various types of algorithms used to attempt to select the appropriate components to be used for a particular type of task, as may include various machine learning algorithms, edge histogram analysis algorithms, optimization algorithms, and adaptive control algorithms, among others.

Figure 3D:
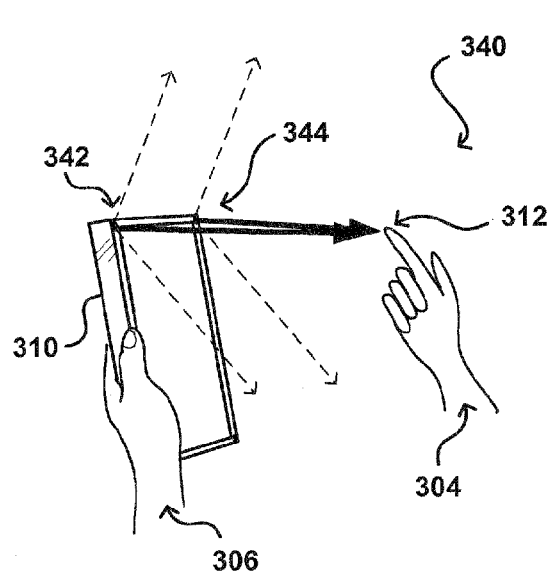
Figure 3E:
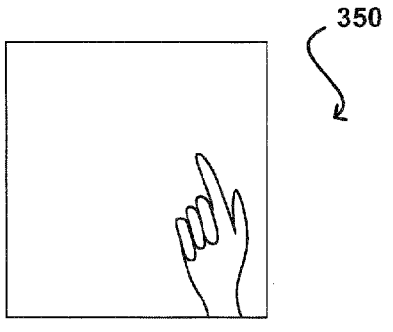
Figure 3F:
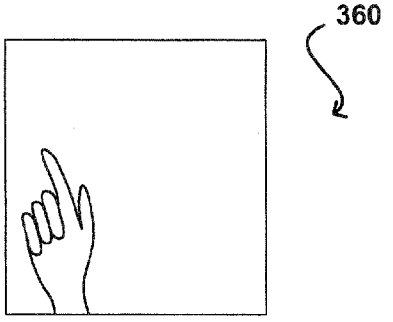

Other approaches can be used to select components to use to capture image information as well. For example, FIG. 3(d) illustrates an example where a user is again holding a computing device 310 in the user's left hand, and performing a gesture with the user's right hand. If the user activates gesture input on a portable computing device, for example, an algorithm executing on the device might determine that a user holding the device might be most likely to hold the device in such a way as to obscure one of the cameras near the bottom of the device, such that the algorithm might select to use two cameras 342, 344 near the top of the device to capture image information. Such an approach can be useful for tasks such as facial recognition as well, where the placement of either of the user's hands 304, 306 might obscure a view of the user's face from one of the lower cameras on the device. In at least some embodiments, the device 310 can determine that it is being held by the user, such as by detecting motion using a component such as an accelerometer or electronic gyroscope or determining contact through a touch-sensitive material on the computing device. In such a situation, the device can again select the top two cameras (or another such selection) to use to capture image information. In this situation, however, the device might also determine that an electronic gyroscope, or other such motion-determining element, should be activated on the device in order to enable motion of the device to be tracked and/or accounted for in the captured image information, which can improve the accuracy of gesture recognition or other aspects of the image information. As discussed above with respect to FIG. 3(d), the images 350, 360 captured by the pair of cameras as illustrated in FIGS. 3(e) and 3(f) can again be used to determine a relative position of the user's fingertip 312 with respect to the computing device. If the device moves between image capture instances, however, the motion of the device can be interpreted as motion of the user's fingertip, which can result in false input or gesture motion detected by the device. Further, device motion can increase the difficulty in subtracting out background information or isolating the user's hand, as movements of the background can make the background more difficult to subtract or remove between images. Accordingly, it can be desirable to activate a gyroscope or other such element that can be used to track changes in device orientation and enable that motion to be accounted for in the gesture determinations. As discussed above, however, elements such as accelerometers and electronic gyroscopes consume a substantial amount of power, such that it can be desirable to utilize such components only when necessary. In at least some embodiments, elements such as stereo cameras or infrared emitters can also be used to separate out the background in order to enable more accurate determination of foreground features, even in situations where distance is not important such that a single camera might otherwise be adequate for image capture. Examples of such elements can be found, for example, in co-pending U.S. patent application Ser. No. 13/198,008, filed Aug. 4, 2011, and entitled "Overcoming Motion Effects in Gesture Recognition," which is hereby incorporated herein by reference.

In addition to the cameras to be used in capturing image information, various illumination elements can be selected to assist with image capture as well, as may depend upon various environmental factors or other such information. For example, a relatively simple image capture and analysis algorithm can utilize ambient-light imaging with a single camera (still or video) to capture images that can be analyzed with an image recognition algorithm. As illustrated in the example image 400 of FIG. 4(a), however, ambient light images can include information for a number of different objects and thus can be very processor and time intensive to analyze. For example, an image analysis algorithm would not only have to differentiate the hand from the door and sidewalk in the image, but would also have to identify the hand as a hand, regardless of the hand's orientation. Such an approach can require shape or contour matching, for example, which can still be relatively processor intensive. A less processor intensive approach would be to separate the hand from the background before analysis.

In at least some embodiments, a light emitting diode (LED) or other source of illumination can be triggered to produce illumination over a short period of time in which an image capture element is going to be capturing image information. The LED can illuminate a feature relatively close to the device much more than other elements further away, such that a background portion of the image can be substantially dark (or otherwise, depending on the implementation). For example, FIG. 4(b) illustrates an example image 410 wherein an LED or other source of illumination is activated (e.g., flashed or strobed) during a time of image capture of at least one camera or other such gesture sensor. As can be seen, the user's hand will appear relatively bright in the image since the hand is relatively close to the device. Accordingly, the background images will appear relatively, if not almost entirely, dark. This approach can be particularly beneficial for infrared (IR) imaging in at least some embodiments. Such an image can be much easier to analyze, as the hand has been effectively separated out from the background, and thus can be easier to track through the various images. Further, there is a smaller portion of the image to analyze to attempt to determine relevant features for tracking.

Such an approach can work both in bright or dark conditions. A light sensor can be used in at least some embodiments to determine when illumination is needed due at least in part to lighting concerns. In other embodiments, a device might look at factors such as the amount of time needed to process images under current conditions to determine when to pulse or strobe the LED. In still other embodiments, the device might utilize the pulsed lighting when there is at least a minimum amount of charge remaining on the battery, after which the LED might not fire unless directed by the user or an application, etc. In some embodiments, the amount of power needed to illuminate and capture information using the gesture sensor with a short detection time can be less than the amount of power needed to capture an ambient light image with a rolling shutter camera without illumination.

In embodiments where there is not a sufficiently fast shutter, where there is a rolling shutter effect, or in other such situations, it might be difficult to substantially prevent detecting reflections from other objects near the device. For example, FIG. 4(c) illustrates an example image 420 that could be captured using an infrared (IR) sensor, for example, wherein the hand is easier to locate in the image but the background is still present enough that an image processing algorithm might have to process other objects in the image, or might not be able to quickly locate a specific feature with a minimum level of certainty. In at least some embodiments, a device can capture both an ambient light image, such as in FIG. 4(a), and a reflected IR image, such as in FIG. 4(b). By having both images, one or more algorithms can be used to shift the images (to account for distance offset of the imaging elements) and then subtract the ambient light image 400 from the reflected IR image 420. The resulting image would be substantially dominated by the hand of the user. In at least some embodiments, a weighted subtraction can be performed when it is determined (due to contrast, lighting, or other such aspects) that the background information is likely much more intense in the ambient light image than the IR image, and vice versa. In some cases, a set of weighted comparisons can be performed until one or more features can be located with a minimum level of confidence. As discussed, however, such an approach can be relatively resource and power intensive, such that it can be desirable to limit such techniques to situations that actually require such an approach to provide adequate gesture recognition or other such results.

Systems and methods in accordance with various embodiments can attempt to provide for adequate performance of specific tasks while optimizing and/or minimizing the power consumption or resource utilization needed to perform those tasks. In particular, one or more optimization or control algorithms are utilized in various embodiments to analyze information, such as a type of task to be performed and/or current environmental conditions, to select a minimum set of components necessary to perform the desired tasks. These algorithms can also update the selection of components over time as conditions change, when adequate results are not provided, or in response to any other such occurrence or variance. In some embodiments, a device can start with a minimum number and/or selection of components for a particular type of task, and can add, adjust, or select different components until adequate results are obtained. Various other approaches can be utilized as well within the scope of the various embodiments.

Figure 5:
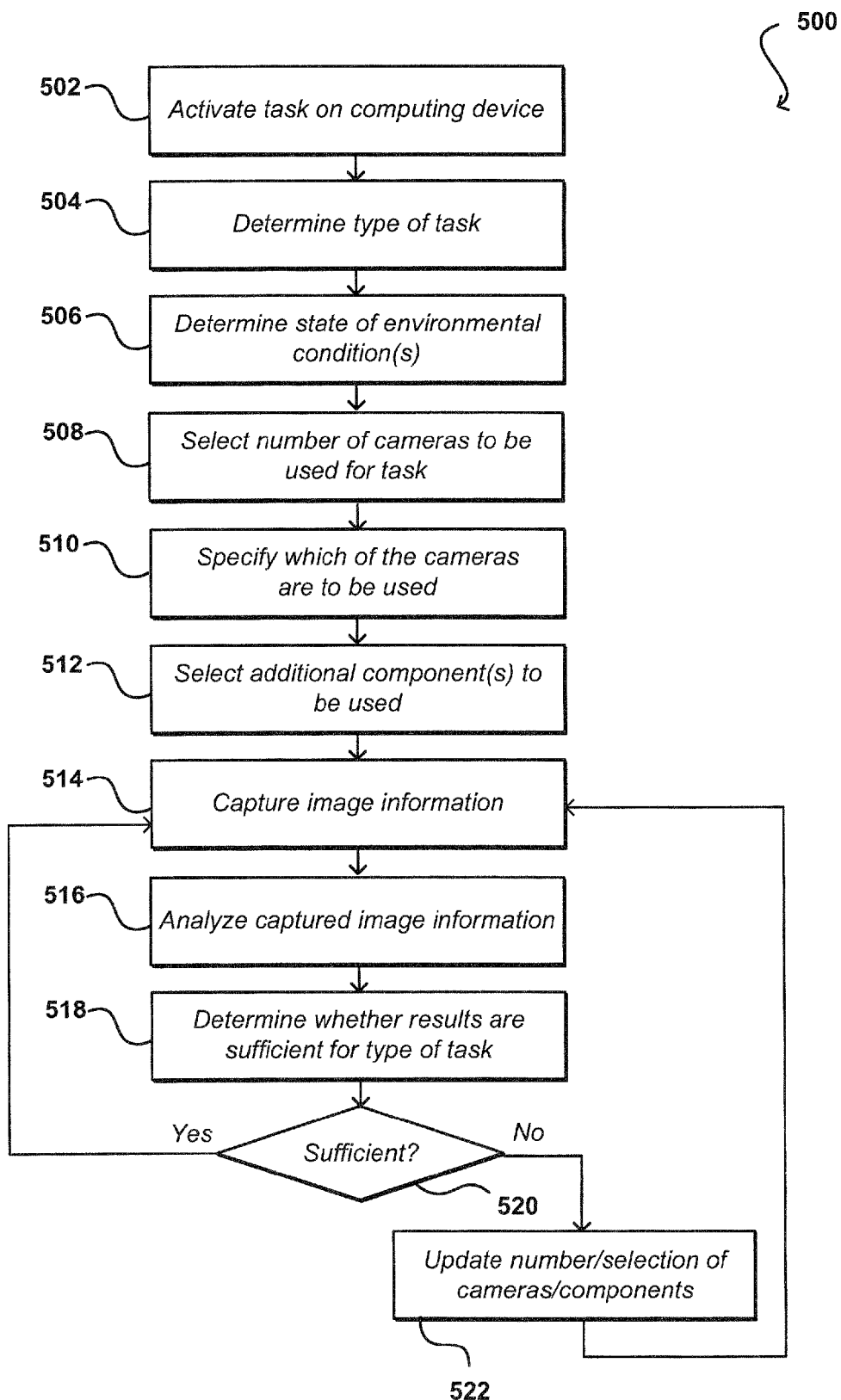
FIG. 5 illustrates an example process for determining components to use for performing a task that can be performed in accordance with various embodiments.

FIG. 5 illustrates an example process 500 for optimizing resources for a selected task that can be used in accordance with various embodiments. It should be understood that, for any process discussed herein, there can be additional, fewer, or alternative steps performed in similar or alternative orders, or in parallel, within the scope of the various embodiments unless otherwise stated. In this example an image-related task, such as a gesture recognition process, is activated 502 on a computing device. The task can be activated manually by the user, automatically by the device in response to the opening of an application or performing of an action, or in response to any other such action or occurrence. In some embodiments, a gesture recognition process might be active any time the device is in an active (or similar) state. As mentioned, a gesture recognition process can utilize one or more optimization algorithms to attempt to optimize the usage of resources on the device to provide for sufficient gesture recognition capability while reducing power consumption or resource utilization to the extent possible, or at least practical, on the device. An example device might have various components that can be used to capture and analyze image information, as may include one or more cameras of the same or different types, one or more illumination elements of the same or different types, an electronic gyroscope, an accelerometer, an inertial sensor, an ultrasonic sensor, a distance determination element, one or more ambient light sensors, an air pressure sensors, an electronic compass, and the like.

In this example, the algorithms will determine 504 the type of task and, concurrently or in sequence, attempt to determine 506 a state of one or more environmental conditions that can affect the appropriate number and type of components to be used in performing gesture recognition. As discussed, this can include an amount of ambient light, a relative orientation of the user, an amount of motion of the device, or other such factors. Based at least in part upon the type of task, the algorithms can select 508 a number of cameras to be utilized. For example, recognition of simple gestures such as swipes or two-dimensional motions might be able to utilize a single camera, as distance information might not be as important. For more complex gestures, which might include motions in three dimensions, it might be desirable to utilize components that are able to detect distance as well as position, such as two cameras or a camera and a distance sensor, etc. Based at least in part upon the state of the determined environmental factors, the algorithms can specify 510 which of the cameras (of the selected number) are to be used in capturing image information for the type of gesture recognition. As discussed, the cameras to be used can be specified based upon factors such as a relative orientation of a user with respect to the device, a current orientation of the device, the field of view of each camera, and other such information. Based at least in part upon the current environmental conditions, the algorithms can also select 512 one or more additional components to be used to capturing and/or analyzing the images. As mentioned, this can include determining whether any illumination elements are needed under current conditions, and if so how many and which illumination elements on the device should be used. Similarly, the algorithms can determine whether any motion determination elements should be activated, which processors might be needed to process the results, which processing approaches should be used, etc.

Once the number and the selection of cameras and other components are determined, the device can begin to capture 514 image information while the selected components are activated. For example, any selected illumination elements can be activated (e.g., flashed or strobed) as appropriate, and any motion-determining element can be activated to determine an amount of motion between image captures. Once a sufficient amount of image information has been captured, as may depend upon the type of task and process being used, an image analysis algorithm, or other such process or application, can analyze 516 the captured image information to attempt to recognize information for the selected task. As discussed, this can include recognizing a gesture in the image, recognizing an identity of a user in the image information, recognizing an object near the device, etc. A determination can be made 518 as to whether the results of the analysis are sufficient for the type of task based upon available information. For example, if a gesture mode has been activated but no gesture is recognized, an algorithm might determine that additional resources are needed for the gesture recognition process. In some embodiments, a detection of motion without recognition of a gesture can be further indicative that the currently utilized components might not be sufficient. In some embodiments, an analysis of the captured image information might be performed to determine whether a quality of the image information meets a minimum image quality criterion for the current task. For example, an edge-detection process might be executed against the image information to determine an amount of blur in the images, or an intensity-determining algorithm might be utilized to determine whether there is adequate lighting for the objects being captured in the image information. In some embodiments, there might be at least one image quality threshold that must be met for a type of task, such as a maximum amount of blur or minimum amount of dynamic range.

If the results are determined 520 to be sufficient for the type of task, such as a gesture being recognized or a user identified, then the process can continue to be performed with the selected cameras and components. If the results are determined not to be sufficient, the number of cameras and/or selection of components can be updated 522 to attempt to improve the results of the process. As discussed, this can involve adding another camera, changing selected cameras, activating an illumination element or changing a brightness of an illumination element, activating a motion-determining element, and the like. The process can continue and adjustments can be made until the results for the task are determined to be at least sufficient.

Figure 6:
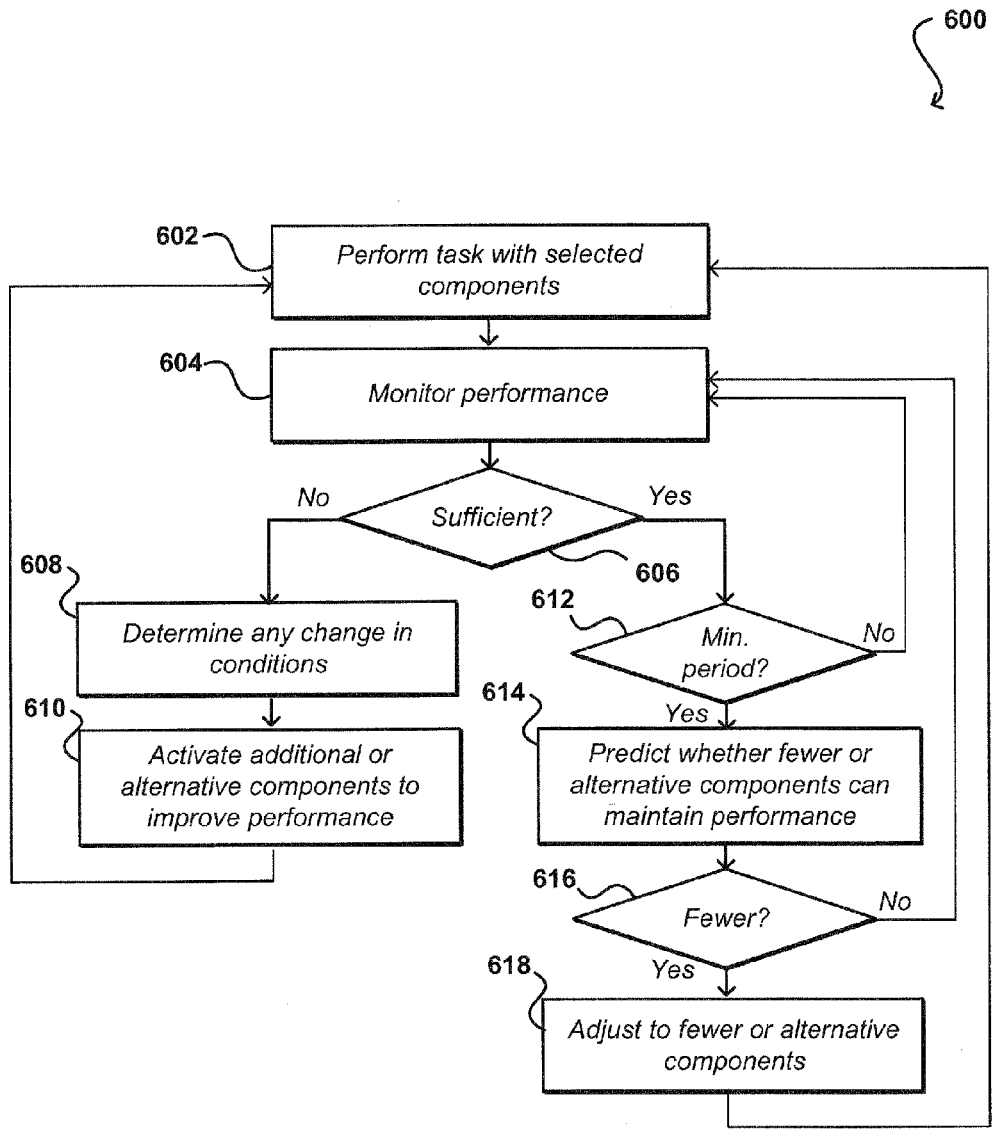
FIG. 6 illustrates an example process for updating a selection of components used for a task that can be performed in accordance with various embodiments.

In addition, performance and changes in conditions can be monitored over time in order to make any changes or adjustments needed to maintain a sufficient level of performance while optimizing, minimizing, or reducing resource consumption for the performance. FIG. 6 illustrates one such process 600 that can be used in accordance with various embodiments. In this example, a task can be performed 602 using the selected components from a process such as that described with respect to FIG. 5 wherein the selection of components has been optimized to provide at least sufficient performance for the selected task. For tasks such as gesture recognition that can occur over a period of time, the performance of that task can be monitored 604 to determine whether the results are still sufficient for the type of task. This can include, for example, determining whether gestures are still being recognized. Other indicators can be used as well, such as detecting a user repeating a gesture multiple times, which can indicate (at least for certain types of gestures) that the gesture was not recognized properly. If the results are no longer sufficient, one or more algorithms and/or components can attempt to determine 608 any changes in conditions between the last time at which the results were sufficient and a time at which results were no longer sufficient. These changes could include, for example, a change in the amount of ambient light around the device, a change in orientation of the user or device, an amount of motion of the device, or other such aspects. Based at least in part upon any changes in environmental conditions, one or more additional or alternative components can be activated 610 on the device to attempt to improve the performance of the task by the computing device. In some embodiments, the adjustment can involve changing a state of one or more components, such as by changing an active resolution of a camera or adjusting a brightness level of an LED, etc. In situations where no changes in environmental conditions can be determined, an algorithm might use rankings or weightings of components, performance metrics, historical behavior information, or any other such information to attempt to predict a combination of components that will be able to provide sufficient performance without utilizing substantially more resources than is necessary.

Even if the performance of the task is sufficient, however, one or more algorithms executing on the computing device (or on a system or service in communication with the computing device) can still attempt to optimize the selection of components to reduce resource consumption. For example, in this process the algorithms can determine 612 whether the performance has been sufficient for at least a minimum period of time. In many embodiments, it can be undesirable to continually optimize components as the optimization process itself utilizes resources, and frequent changes can increase the likelihood that some of the results will not be adequate. In some embodiments, an algorithm might wait at least 10 seconds or 30 seconds, for example, before attempting to adjust component selections or settings when the selection is performing with sufficient results. If the results have not been sufficient for the minimum period of time, the device can continue processing with the current selection. If the results have been at least sufficient for at least the minimum period of time, a results prediction algorithm or other such process or component can attempt to predict 614 whether fewer or alternative components, settings, or configurations can be used to maintain sufficient performance while reducing resource consumption. In one embodiment, an application can attempt to determine changes in environmental conditions, such as a change in ambient lighting or movement that might indicate that a component might no longer be needed. For example, if the user went from an area that was dark to an area that is light, as may be determined by a light sensor or other such component, an optimization algorithm might be able to predict that a white light LED no longer needs to be utilized to provide sufficient light for image capture. Similarly, if a user has placed a device in a stationary setting such that the device is no longer moving, the device might be able to deactivate an electronic gyroscope or other such component. Various other changes can be made as well as discussed and suggested herein.

If no prediction is made 616 that indicates, at least with a minimum level of confidence, that a fewer number of components (or other such reduction in resources) can be used to perform the task with sufficient performance, the process can continue with the current selection and configuration of resources. If however, it is predicted that the resource allocation for the process can be reduced while maintaining performance, the number, selection, and/or configuration of components can be adjusted 618 to attempt to perform the task while consuming fewer resources. The device can then perform the task using the adjusted settings and monitor performance. If the performance stays at least sufficient for that type of task, the performance can continue with the current settings. If performance is not sufficient, the process can either go back to the previous configuration or attempt to determine a new selection of components and settings that would provide sufficient performance. Various other approaches can be used as well within the scope of the various embodiments.

Such approaches can be applied to the situation discussed above with respect to FIGS. 3(a) to 3(f), wherein a user is attempting to provide gesture input to a computing device including (at least) four cameras each having a respective light source, such as an IR LED. Operating all the cameras and LEDs might utilize as much as 30% of the power consumption of the entire system for certain devices. Accordingly, one or more optimization algorithms can attempt to reduce the amount of power consumption through software by determining how many cameras, light sources, and other components are actually needed to provide adequate performance, and activate only those components for gesture recognition. As discussed, the number, selection, and state of components can vary between tasks, as well as for performance of the same or similar tasks under different conditions.

In one embodiment, an algorithm can determine that the type of gesture recognition that has been activated generally requires depth information, or information in three-dimensional space, such that two cameras should be used to provide stereo vision. For some devices, this could instead involve one camera and a distance sensor where the device includes a distance sensor and it is determined that the one camera/sensor approach consumes fewer resources than a stereo camera approach while providing sufficient performance. As discussed, the process can also involve selecting which two cameras to use to capture image information. As discussed above, an image recognition process (or other process discussed herein) can be used to attempt to determine which hand the user is using to make the gestures and/or hold the device, which can affect the selection of the cameras. Similarly, the device can attempt to determine whether the device is being held, in motion, or otherwise in an orientation that dictates which cameras should be used to capture the gesture information. For stereo image capture, a relative orientation and/or separation of the two cameras might be needed to provide the desired stereo effect (or at least provide sufficiently overlapping fields of view). Various other processes and information can be used as well.

The device can also attempt to determine whether illumination will likely be needed, and if so how many (and which) LEDs should be activated. If the recognition approach uses IR radiation, it can be determined that at least one IR LED will likely be needed to provide for adequate gesture detection. If ambient or visible light is to be used, a mechanism such as a light sensor (or information from one of the cameras, etc.) can be used to determine an amount of light in the vicinity of the user or device, to determine whether (and how much) illumination will be needed. In some embodiments, a single LED with a relatively low brightness setting can be used initially, where the brightness can be increased until a maximum value is reached and then additional LEDs utilized until sufficient performance is obtained. In other embodiments the device can look at information such as the amount of ambient light, the distance and location of the user's hands or other features, historical performance data, and other such information to attempt to predict the minimum amount of illumination that should be provided to provide sufficient performance for the current type of task under the current conditions. The selection of which LEDs to use can be based at least in part upon which cameras are selected, the relative position and/or orientation of the user with respect to the device, and other such information.

Similarly, a determination can be made as to the amount of motion of the device at the current time to determine whether a motion- or orientation-determining element of the device should be activated. For example, a user holding an electronic device in one hand will cause small motions of the device over time. A rotation of the device can result in a significant shift in the locations of various objects in the captured image information. Based on the amount and type of motion, the device can decide to activate one or more elements to attempt to monitor an amount and direction of motion of the device during image capture, to attempt to remove the effects of the motion from the images.

As discussed, the operational state of various components can be selected as well using various algorithms discussed and suggested herein. For example, some algorithms only require a small number of pixel values in order to determine a type of gesture, such as a swipe from left to right or up and down. For such a type of process, an algorithm might select an initial resolution of a camera (e.g., a 20×20 pixel array) to use to capture the image information. As known in the art, activating more pixels consumes more energy and provides more data to be processed, so it can be desirable to limit the number of pixels used to the extent possible. If the results are not adequate, the resolution can be increased up to the full resolution of the camera. In some embodiments, lower resolution cameras might be selected first, with higher resolution cameras being used only when the results are not sufficient under current conditions for the selected type of task. Similarly, if a user goes between broad gestures (such as swipes of a hand) and fine gestures (such as drawing letters with a fingertip), the resolution and/or selection of cameras might need to be adjusted accordingly. If the environment is variable such that the lighting changes frequently or objects are moving in the background, an algorithm might select a higher number of cameras or higher resolution to attempt to provide a greater amount of information to attempt to use to recognize gestures, etc. As conditions settle, the number of cameras or other components can be reduced accordingly.

In some embodiments, one or more algorithms can attempt to predict future conditions in order to deactivate cameras or other components that are not likely to be needed in the perceivable future. For example, a user might change an orientation of the device, or move with respect to the device, such that the user is no longer within a field of view of a particular camera. In such a situation, the device might decide to deactivate that camera. If the device notices the user moving back towards that location, the device can re-activate the camera. Similarly, if the device detects that the device has been placed on a stationary surface, the device might deactivate a motion- or orientation-determining element (e.g., an accelerometer, electronic gyroscope, inertial sensor, or electronic compass) and any camera or LED that is now obscured by the surface. The device might also switch from stereo image capture to mono image capture, where stereo imaging was activated due to an amount of background movement in the images due to movement of the device. If performance is sufficient for a period of time, the device might shut off other environmental condition sensors as well, such as ambient light sensors, pressure sensors, microphones, and the like.

Certain embodiments can also attempt to optimize the processors and/or algorithms that will be used to perform a particular task. For example, if the gesture mode is looking for a wake-up motion such as a simple left to right motion, the algorithm might decide to use a single camera in a low-resolution mode, and utilize an on-board processor of the camera module with a low-resolution template-matching algorithm to attempt to recognize such a gesture, instead of using a complex matching algorithm with a central processor of the device. If sufficient performance is not obtained, the device can utilize more powerful processors, more robust algorithms, and other such components or processes.

Various actions of the user can cause components to be deactivated or adjusted as well within the scope of the various embodiments. For example, if a user is typing on a mobile device then cameras used to detect gestures can likely be deactivated during the typing as those actions are typically exclusive. If the user is holding the device up to the user's ear during a phone call, the cameras and illumination elements might be deactivated. Similarly, if the user places the device in a pocket or backpack, all cameras might be deactivated for a period of time. Various other approaches can be used as well within the scope of the various embodiments.

Other information can be considered as well in different embodiments. For example, the device can monitor a state of the battery of the device when not plugged in. If the battery is in a low power state or is subject to maximum load, for example, the device might select fewer components, lower resolutions, less robust algorithms, or other such configurations to attempt to conserve more battery power than under normal circumstances. In some embodiments, an approach might be selected that is more memory or processor consuming, for example, but provides less drain on the battery by reducing the use of lighting, secondary components, etc. In some embodiments, the time of day might be used as a factor to determine an amount of light that might be needed, in order to further reduce battery consumption.

Various types of information can also be indicators that additional resources might be needed for the current task. For example, a device can utilize one or more statistical analysis approaches to determine how often a user goes back and repeats a gesture as an indication of the sufficiency of the performance. Similarly, if the device detects motion but no gestures for a period of time, the device might at least temporarily increase the resources used for the task to attempt to determine whether gestures are being made but not recognized. In some embodiments, there might be a simple cancel motion that can easily be detected under most conditions, which can be used to determine how often a gesture is being correctly (or incorrectly) recognized. In some embodiments, the device can attempt to monitor a frustration level of the user, such as may accompany an increased heart rate, use of certain words or language, nodding the head in a "no" motion, or various facial expressions. Various other processes can be used to attempt to determine when to increase the resources dedicated to the present task.

In some embodiments, the captured video information can be pre-preprocessed to assist with gesture recognition. For example, the video information can be converted to a grayscale image to reduce the amount of processing capacity needed, as well as to more easily distinguish edges in the image. Similarly, even when more than one image is captured the images might be analyzed one at a time for certain tasks in order to reduce processing time when analysis of less than all the captured images will suffice.

Similarly, settings for various users and conditions can be stored as starting points for future tasks. For example, a first configuration might work for a first user in the car while a second configuration might work for the first user at work. A third configuration might work for a different user in the same car or workplace, due to variations in the way gestures are made, features of the user, or other such information. These combinations of users and settings can be stored on the device or in a location accessible by that device. In some embodiments, the optimization algorithms can be executed at a location remote from the device, such as a system or service operating in "the cloud."

Figure 7:
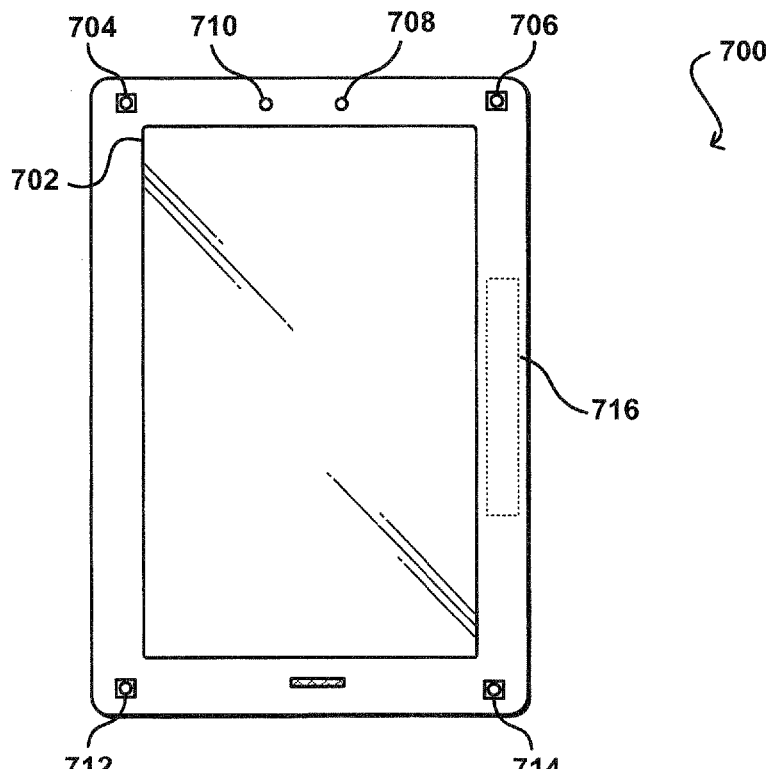
FIG. 7 illustrates an example computing device that can be used in accordance with various embodiments.

FIG. 7 illustrates an example computing device 700 that can be in accordance with various embodiments. In this example, the device has at least four conventional digital cameras 704, 706, 712, 714 on a same side of the device as a display element 702, enabling the device to capture image information for a user of the device during typical operation where the user is at least partially in front of the display element, and thus at least partially within the field of view of at least some of these cameras. In addition, there is at least one illumination element 708 (e.g., a white light or IR LED) positioned on the same side of the device such that an object captured by one of the cameras can be at least partially illuminated by the illumination element(s). This example device also includes a light sensor 710 that can be used to determine an amount of light in a general direction of an image to be captured. The device also includes at least one orientation-determining element 716, such as an accelerometer, inertial sensor, or electronic gyroscope, operable to determine motion of the device for use in adjusting the relative position of objects in images captured at different times. Various other elements and combinations of elements can be used as well within the scope of the various embodiments as should be apparent in light of the teachings and suggestions contained herein.

Figure 8:
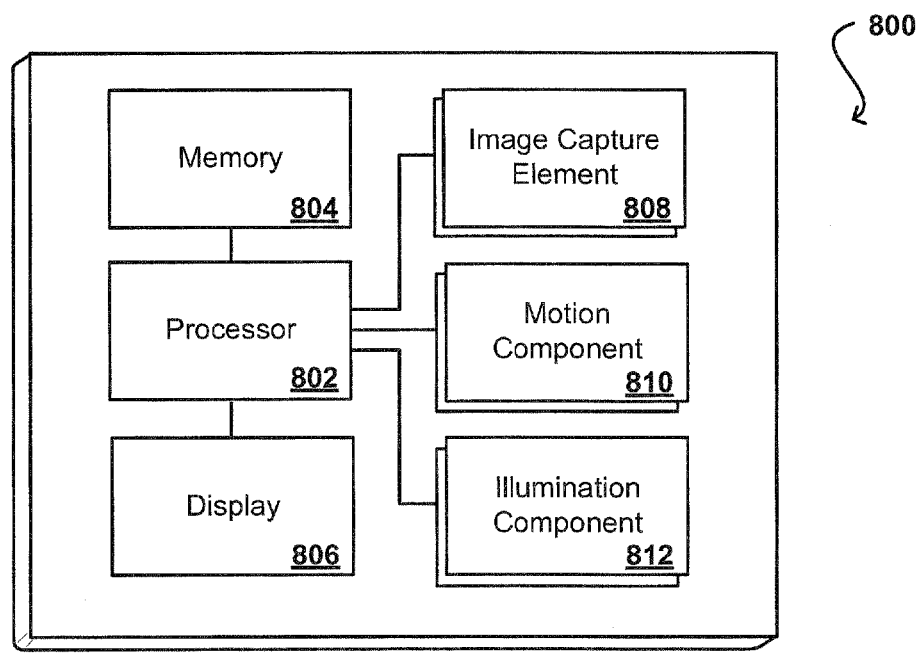
FIG. 8 illustrates an example configuration of components of a computing device such as that illustrated in FIG. 6.

In order to provide various functionality described herein, FIG. 8 illustrates an example set of basic components of a computing device 800, such as the device 700 described with respect to FIG. 7. In this example, the device includes at least one central processor 802 for executing instructions that can be stored in at least one memory device or element 804. As would be apparent to one of ordinary skill in the art, the device can include many types of memory, data storage or computer-readable storage media, such as a first data storage for program instructions for execution by the processor 802, the same or separate storage can be used for images or data, a removable storage memory can be available for sharing information with other devices, etc. The device typically will include some type of display element 806, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 808, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The device can include at least one motion component 810, such as an accelerometer, inertial sensor, or electronic gyroscope, operable to detect changes in the position and/or orientation of the device. The device also can include at least one illumination element 812, as may include one or more light sources (e.g., white light LEDs, IR emitters, or flash lamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could be connected by a wireless, infrared, Bluetooth, or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 9:
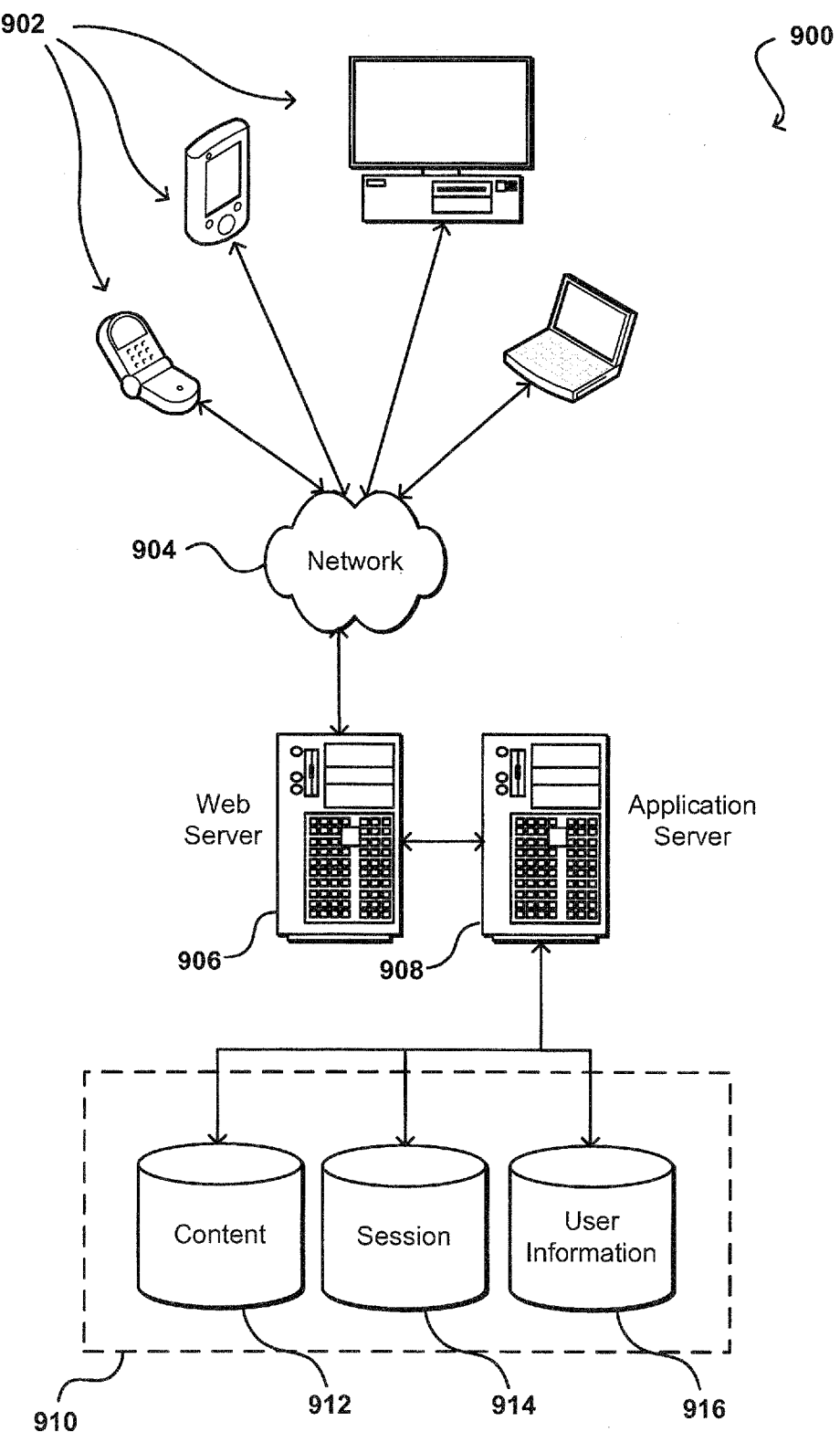
FIG. 9 illustrates an example environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of selecting resources to perform gesture recognition on a computing device, comprising:
    under control of one or more computer systems configured with executable instructions,
        activating gesture detection on the computing device, the computing device including a plurality of cameras and at least one illumination element;
        determining a state of at least one environmental condition pertaining to performance of the gesture detection;
        selecting a minimum number of cameras of the plurality of cameras and a minimum number of illumination elements to use to capture the image information based at least in part on a type of the gesture detection to be performed and the determined state of the at least one environmental condition;
        capturing image information using the minimum number of cameras and the minimum number of illumination elements;
        analyzing the captured image information to attempt to recognize a gesture performed by a user,
        adjusting at least one of the minimum number of cameras, the selection of cameras, a functional state of the cameras, or the minimum number of illumination elements used to capture subsequent image information when no gesture is recognized from the captured image information for a determined period of time;
        determining a gesture from the captured subsequent image information, the gesture corresponding to a type of input for the computing device;
        determining that the performance of the gesture detection has been sufficient to detect at least one gesture over a predetermined period of time;
        determining whether using a fewer number of cameras or a fewer number of illumination elements would detect at least one gesture over the predetermined period of time; and
        reducing, based at least in part on determining that using the fewer number of cameras or the fewer number of illumination elements would detect at least one gesture, a current number of cameras or a current number of illumination elements used to perform the gesture detection, the current number of cameras, after the reducing, including at least one camera used to perform the gesture detection.

2. The computer-implemented method of claim 1, further comprising:
    determining, after analyzing the captured image information to attempt to recognize the gesture performed by the user, that no gesture is recognized.

3. The computer-implemented method of claim 1, wherein selecting the minimum number of cameras further comprises detecting a right hand or left hand of the user visible by at least one of the cameras.

4. The computer-implemented method of claim 1, further comprising:
    determining the minimum number of illumination elements based at least in part on the type of the gesture recognition to be performed and the state of the at least one environmental condition.

5. A computer-implemented method of selecting resources to perform a task on a computing device, comprising:
    selecting, using the at least one processor of the computing device, a number of components on the computing device to use to capture image information for a task to be performed on the computing device, the number of components including a camera;
    attempting to perform the task using at least the image information captured using the selected number of components;
    monitoring performance of at least a portion of the task;
    adjusting, using the at least one processor of the computing device, at least one of the number of components or a selection of components used to capture image information based at least in part on the monitored performance, wherein the number of components are selected to utilize an amount of resources on the computing device that is adjusted for current environmental conditions and sufficient to enable the task to be performed to at least a determined level of performance;
    determining that the task has been performed at the determined level of performance for at least a predetermined period of time;
    determining whether using a fewer number of components would perform the task to the determined level of performance; and
    reducing, based at least in part on determining that the fewer number of components would perform the task, a current number of components used to perform the task to the determined level of performance, the current number of components, after the reducing, including at least one camera used to perform the task.

6. The computer-implemented method of claim 5, wherein the number of components on the computing device are further selected to analyze the captured image information.

7. The computer-implemented method of claim 6, wherein the type of components includes at least one of a camera, an illumination source, an electronic gyroscope, an inertial sensor, an electronic compass, a pressure sensor, a light sensor, a processor, or an algorithm.

8. The computer-implemented method of claim 7, wherein the algorithm includes at least one of a machine learning algorithm, an edge histogram analysis algorithm, an optimization algorithm, or an adaptive control algorithm.

9. The computer-implemented method of claim 5, wherein the at least one environmental condition includes at least one of an amount of ambient light, a confidence in a recognition algorithm, a distance to an object, an amount of motion, a confidence in a result, or an amount of remaining battery life.

10. The computer-implemented method of claim 5, wherein adjusting at least one of the number of components or the type of components used to capture image information includes increasing the number of components or adjusting a functional aspect of at least one of the components when the task is not performed to at least the determined level of performance.

11. The computer-implemented method of claim 5, wherein adjusting at least one of the number or type of components used to capture image information includes decreasing the number of components or adjusting a functional aspect of at least one of the components when the task is predicted to be able to be performed to at least the determined level of performance after the adjusting.

12. The computer-implemented method of claim 11, wherein the capability of at least one of the components includes at least one of a resolution of a camera, a sensitivity of a sensor, or an intensity of an illumination element.

13. The computer-implemented method of claim 5, wherein the type of task includes at least one of gesture recognition, facial recognition, head tracking, gaze tracking, and object tracking.

14. The computer-implemented method of claim 5, wherein at least the portion of the task includes at least one of image capture, pattern matching, gaze direction determination, head location determination, object identification, facial identification, motion detection, or gesture recognition.

15. The computer-implemented method of claim 5, wherein the selected number and type of components is based at least in part upon historical performance data for a user of the computing device.

16. The computer-implemented method of claim 5, further comprising:
predicting a change in at least one of an environmental condition or a position of a user with respect to the computing device; and
adjusting at least one of the number, the type, or the state of at least one component on the computing device in response to the predicted change.

17. A computing device, comprising:
a device processor;
at least one camera;
at least one light source; and
a memory device including instructions operable to be executed by the processor to perform a set of actions, enabling the computing device to:
select a number of components on the computing device to use to capture the image information for a task to be performed on the computing device, the number of components including the at least one camera;
analyze the captured image information to attempt to complete at least a portion of the task;
adjust at least one of the number of components or a functional state of one of the components used to capture image information when at least a portion of the task is unable to be completed to a determined level of performance,
wherein the number of components are selected to utilize an amount of resources on the computing device that is adjusted for current environmental conditions;
determine that the task has been performed to the determined level of performance for at least a predetermined period of time;
determine whether using a fewer number of components would perform the task to the determined level of performance; and
reduce, based at least in part on determining that using the fewer number of components would perform the task, a current number of components used to perform the task to the determined level of performance, the current number of components, after being reduced, including at least one camera used to perform the task.

18. The computing device of claim 17, wherein the instructions when executed further cause the computing device to:
select a number of components on the computing device to use to analyze the captured image information.

19. The computing device of claim 17, wherein the number of components includes at least one of a camera, an illumination source, an electronic gyroscope, an inertial sensor, an electronic compass, a pressure sensor, a light sensor, a processor, or an algorithm.

20. The computing device of claim 17, wherein the instructions when executed further cause the computing device to:
determine a hand of a user visible to perform a gesture, the selected number of components on the computing device to use to capture the image information being based at least in part upon the determined visible hand.

21. A non-transitory computer-readable storage medium storing instructions that, when executed by a processor, cause a computing device to:
select a number of components on the computing device to use to capture image information for a task, the number of components including a camera;
analyze the captured image information according to a type of the task to be performed;
adjust at least one of the number of components or a functional state of one of the components used to capture or analyze the image information when the task is unable to be performed to at least a minimum level of performance,
wherein the number of components is selected to utilize an amount of resources on the computing device that is adjusted for current environmental conditions;
determine that the task has been performed to the minimum level of performance for at least a predetermined period of time;
determine whether using a fewer number of components would perform the task to the minimum level of performance; and
reduce, based at least in part on determining that the fewer number of components would perform the task, a current number of components used to perform the task to the minimum level of performance, the current number of components, after being reduced, including at least one camera used to perform the task.

22. The non-transitory computer-readable storage medium of claim 21, wherein the instructions when executed further cause the computing device to:
select at least one component on the computing device to use to analyze the captured image information.

23. The non-transitory computer-readable storage medium of claim 21, wherein the task includes at least one of pattern matching, object identification, facial identification, motion detection, gaze direction determination, head location determination, or gesture recognition.

24. The non-transitory computer-readable storage medium of claim 21, wherein the instructions when executed further cause the computing device to:
   predict a change in at least one of an environmental condition or a position of a user; and
   adjust at least one of the number of components or a functional state of at least one component on the computing device in response to the predicted change.

25. The non-transitory computer-readable storage medium of claim 21, wherein the instructions when executed further cause the computing device to:
   monitor a power level of a battery of the computing device; and
   adjust at least one of the number of components or a functional state of at least one component on the computing device when the power level drops below a determined value.

26. The computer-implemented method of claim 1, wherein the selection of the minimum number of cameras is based at least in part upon a determination of a right or left hand of the user holding the computing device.

\* \* \* \* \*